United States Patent Office 3,315,467
Patented Apr. 25, 1967

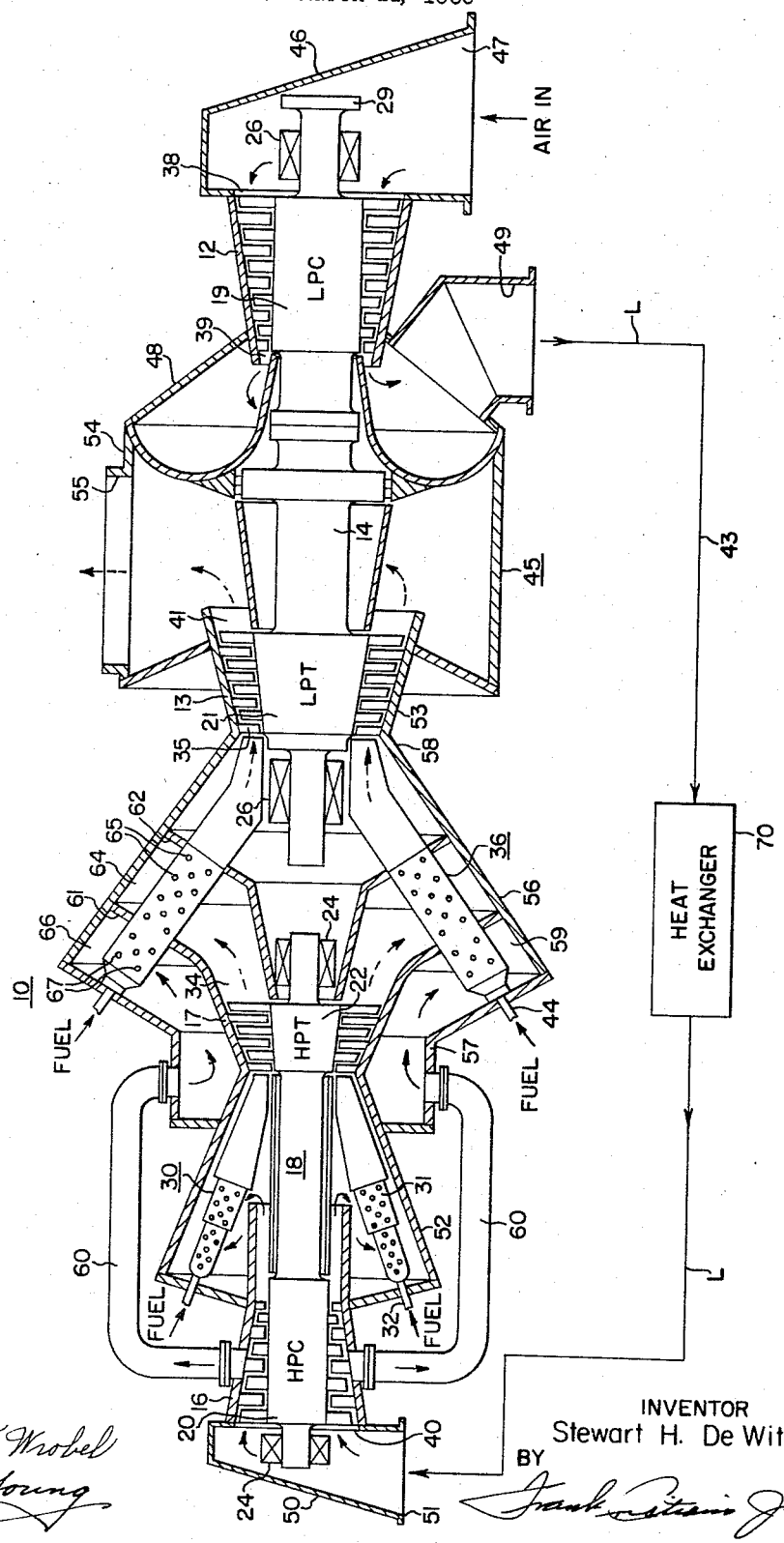

3,315,467
REHEAT GAS TURBINE POWER PLANT WITH AIR ADMISSION TO THE PRIMARY COMBUSTION ZONE OF THE REHEAT COMBUSTION CHAMBER STRUCTURE
Stewart H. De Witt, Marple Township, Media, Pa., assignor to Westinghouse Electric Corporation, Pittsburgh, Pa., a corporation of Pennsylvania
Filed Mar. 11, 1965, Ser. No. 438,853
6 Claims. (Cl. 60—39.17)

This invention relates to open-cycle gas turbine power plants for delivering shaft power, more particularly to complex cycle gas turbine power plant of the above type, and has for an object to provide an improved power plant of this type.

Another object is to provide a power plant of the above type having at least a pair of gas turbine units disposed in series motive fluid flow relation with each other and having an improved arrangement for reheating the motive fluid after partial expansion in the first turbine unit, and before admission to the other turbine unit for further expansion.

A further object is to provide a power plant of the above type having an air compressor driven by each turbine unit in which a portion of the partially compressed air from one of the compressors is directed to the reheating means for modifying the reheating of the motive fluid from the first turbine.

Still another object is to provide a unitary complex cycle gas turbine power plant, with reheating between turbine units, that is compact, of reduced size for its rating, and minimizes thermal and fluid pressure drop losses, while effecting economies in manufacture.

Briefly, in accordance with the invention, there is provided a complex open-cycle gas turbine power plant having at least a pair of turbines drivingly connected to a pair of air compressors and disposed in coaxial alignment, with the two turbines disposed in series motive fluid flow relation with each other, so that the partially expanded motive fluid from one of the turbines is directed to the other turbine for motivating the latter by further expansion.

The turbine and compressors are disposed within unitary tubular casing structure including an annular casing portion defining the motive fluid passageway between the two turbines, and fuel combustion apparatus is disposed in the passageway for reheating the partially expanded motive fluid before further expansion.

Means is further provided for bleeding a portion of the at least partially compressed air from one of the compressors and directing it to the reheater to film-cool the metallic wall structure thereof and/or to provide primary air for fuel combustion.

The above and the objects are effected by the invention as will be apparent from the following description and claims taken in connection with the accompanying drawing, forming a part of this application, in which:

The sole figure is an axial sectional view illustrating an open-cycle gas turbine power plant arranged in accordance with the invention.

Referring to the drawing in detail, there is shown an open-cycle gas turbine power plant, generally designated 10, formed and arranged in accordance with the invention and comprising a low pressure, multi-stage, axial flow compressor 12, a low pressure, multi-stage, axial flow turbine 13 connected to the compressor 12 in driving relation therewith by a suitable shaft 14, a high pressure, multi-stage, axial flow compressor 16 and a high pressure, multi-stage, axial flow turbine 17 drivingly connected to the high pressure compressor 16 by a suitable shaft 18.

As well known in the art, the compressors 12, 16 and turbines 13, 17 are provided with bladed rotor structures 19, 20, 21 and 22, respectively, and the compressor rotor 19 is rotatively driven by the turbine shaft 14, while the compressor rotor 20 is rotatably driven by the turbine shaft 18. For brevity, "HP" and "LP" will hereafter be employed to designate "high pressure" and "low pressure." The HP rotor aggregate, comprising the HP rotor 20, 22 and the shaft 18, is suitably supported at its ends by a pair of bearings 24 and, in a similar manner, the LP rotor aggregate, comprising the rotors 19, 21 and the connecting shaft 14, is suitably supported for rotation by bearings 26 at its opposite ends. The LP rotor aggregate is provided with a suitable power output shaft 29 for driving an external load (not shown) in a manner well known in the art.

Between the outlet of the HP compressor 16 and the inlet of the HP turbine 17, there is provided suitable fuel combustion apparatus, generally designated 30, including an annular array of fuel combustion chambers 31 of the elongated cannister type having means for injecting fuel thereinto as indicated at 32, whereby fuel from any suitable supply (not shown) may be provided and mixed with the pressurized air from the HP compressor to form hot pressurized products of combustion for motivating the HP turbine 17.

Also, interposed between the outlet 34 of the HP turbine 17 and the inlet 35 of the LP turbine 13 there is provided fuel combustion apparatus including an annular array of fuel combustion chambers 36, for reheating the partially expanded motive gases from the HP turbine 17 before admission to the LP turbine 13 for further expansion.

The LP compressor 12 is provided with an air inlet 38 and an air outlet 39, and the HP compressor 16 is provided with an air inlet 40. Further, the LP turbine 13 is provided with an exhaust gas outlet 41.

Accordingly, as thus far described, the operation of the power plant is as follows. Atmospheric air is drawn into the LP compressor 12 through the inlet 38 and compressed during its flow therethrough and directed to the outlet 39 at a low pressurization level. The thus pressurized air from the LP compressor 12 is directed to the inlet 40 of the HP compressor 16, as indicated by the line 43, for further pressurization as it flows through the HP compressor unit 16. Whereupon the highly pressurized air from the HP compressor 16 is directed to the combustion chambers 31 and mixed with the fuel admitted thereto to form a combustible mixture which is ignited by means (not shown) to form highly pressurized hot motive fluid for motivating the HP turbine 17. As the hot motive fluid flows through the HP turbine 17, the HP rotor structure 22 is motivated and thereby drives the HP compressor 16 to sustain rotation thereof.

The HP turbine 17 is formed in a manner to partially expand the motive gases during their flow therethrough and the thus partially expanded gases from the HP turbine 17 are directed into the combustion apparatus 36 to form a combustible mixture with fuel admitted thereto, as indicated by the fuel conduits 44, which mixture is ignited by means (not shown) to reheat and augment the mass of the partially expanded gases before admission to the LP turbine 13 for further and substantially complete expansion, thereby motivating the LP turbine rotor 21 and causing the LP compressor 19 to rotate in a sustained or continuous manner.

The HP rotor aggregate 20, 18, 22 and the LP rotor aggregate 21, 14, 19 are disposed in spaced coaxial alignment with each other and the entire structure, as thus far described, is enclosed in unitary external housing structure, generally designated 45, to form a unitary and compact power plant. More specifically, the housing structure 45 includes an air inlet hood structure 46 having an opening 37 for receiving and directing the atmospheric air into the LP compressor unit 12; an air outlet hood 48 encompassing the outlet 39 of the LP compressor and having an outlet opening 49; and an air inlet hood 50 having an opening 51 for directing the low pressurized air from the LP compressor 12 to the HP compressor 16 and connectable to the outlet 49 by an external suitable conduit, indicated by the line L. The housing structure 45 further includes shell structure 52 of generally annular cross section enclosing the HP compressor 16, the HP turbine 17, and the associated fuel combustion chambers 31. Further, the housing structure 45 includes shell structure 53 of generally annular cross sectional shape enclosing the LP turbine 13 and encompassed by an exhaust shell structure 54 extending from the LP turbine 13 to the outlet hood 48 for the LP compressor 12 and having an exhaust outlet 55 for directing the exhaust gases from the LP turbine 13 to atmosphere.

A main feature of the housing structure 45 resides in a casing structure 56 of generally annular cross sectional shape enclosing the reheat fuel combustion apparatus 36 and having an upstream end portion 57 encompassing the HP turbine 17 and a downstream end portion 58 disposed in encompassing relation with the LP turbine inlet 35 thereby defining a plenum chamber 59 forming a gas flow passageway therebetween.

There are further provided a plurality of flow conduits 60 disposed externally of the turbine shell structure 52 and communicating at one end with an intermediate pressure stage of the HP compressor 16 and at the other end with the plenum chamber 59. Accordingly, during operation, some of the compressed air from the HP compressor 16 is directed through the flow conduits 60 into the plenum chamber 59 and then into the fuel combustion apparatus 36 to film-cool the wall structure of the latter and/or to provide primary air for combustion.

The casing 56 is preferably further provided with a pair of concentric flared partition members 61 and 62 disposed in spaced relation with each other and dividing the plenum chamber 59 into a first annular passageway 64 communicating with the exhaust outlet 34 of the HP turbine 17 and a group of apertures 65 formed in the combustion chambers 36, and a second annular passageway 66 disposed in communication with the outlets of the flow conduits 60 and a group of apertures 67 in the fuel combustion chambers 36. As well known in the art, the groups of apertures 67 are usually known in the art as primary air admission apertures and are employed to admit primary air into the fuel combustion chambers 36 to initiate combustion and provide film-cooling of the walls of the combustion chambers 36, while the group of apertures 65 are known as secondary air admission apertures, and are employed to admit secondary fluid into the fuel combustion chambers to cool or moderate the resulting hot combustion products to a tolerable level. Accordingly, with this arrangement, the air bled from the HP compressor 16 and directed through the flow conduits 60 into the passageway 64 is primarily employed to sustain the combustion of fuel and prevent overheating of the combustion chambers, while the exhaust gases from the HP turbine 17 are primarily directed to the fuel combustion apparatus 36 by the passageway 64 to moderate and/or be reheated by the hot combustion gases, as described above. This arrangement is highly advantageous, since the pressurized air that is bled from the HP compressor 16 contains more oxygen than the exhaust gases from the HP unit 17.

It will now be seen by following the solid line arrows (indicative of air flow) and the dotted line arrows (indicative of combustion gas flow) that the flow cycle of the power plant described above is a series flow arrangement with the flow of the fluids being confined within the housing structure 45 throughout their entire extent, with the exception of the flow of the low pressure air from the LP compressor to the HP compressor 16 by way of the external conduit L. A suitable intercooling heat exchanger 70 may be interposed in the conduit L, for well known reasons. Accordingly, there is provided a highly efficient arrangement that is effective to minimize losses of heat from the motive gases to the atmosphere, as well as to minimize the fluid pressure losses during flow through the power plant.

It must further be pointed out that the plenum chamber 59 formed by the casing structure 56 provides a relatively short and unrestricted passageway for the exhaust gases from the HP turbine 17 to the LP turbine 13, thereby imposing minimum pressure drop losses. Also, the reheating of the exhaust gases from the HP turbine 17 is attained by direct heat exchange with the hot combustion gases in the combustion chambers 36 during flow through the plenum chamber 59.

Further advantages of the arrangement are at follows:
First, the compact coaxial arrangement minimizes vertical and horizontal space requirements and thus further simplifies the mounting of the power plant at the site for which it is intended.

Second, the unitary housing structure minimizes differential expansion problems, since the housing structure is free to expand in opposed axial directions without substantial stress.

Third, the usual external piping to and from the reheat apparatus is eliminated, thereby eliminating the cost of such piping and joints therefor.

Fourth, the direct connection between the HP turbine and the LP unit minimizes the pressure drop of the fluid therethrough, thereby permitting a higher output and thermal efficiency.

Although only one embodiment of the invention has been shown it will be obvious to those skilled in the art that it is not so limited, but is susceptible of various other changes and modifications without departing from the spirit thereof.

I claim as my invention:
1. A unitary open-cycle gas turbine power plant, comprising:
    a first multi-stage compressor having a rotor and a second multi-stage compressor having a rotor,
    a first gas turbine drivingly connected to said first compressor rotor,
    a second gas turbine drivingly connected to said second compressor rotor and having an output shaft for driving an external load,
    said turbines and compressors being coaxially arranged,
    first fuel combustion apparatus interposed between said first compressor and first turbine for providing hot motive gases to said first turbine,
    casing structure encompassing the outlet of said first turbine and the inlet of said second turbine and effective to provide a passageway for the exhaust gases from said first turbine to said second turbine to motivate the latter,
    second fuel combustion apparatus interposed in said passageway for reheating the exhaust gases from said first turbine before admission to said second turbine,
    said second fuel combustion apparatus including at least one tubular combustion chamber,
    said combustion chamber having a primary combustion zone and a secondary combustion zone,
    means for admitting fuel to said primary zone,
    means defining a first passageway for directing the exhaust gases into said secondary zone, and
    means for bleeding pressurized air from one of said compressors and defining a second passageway for directing the bled air to said primary zone for combustion.

2. The structure recited in claim 1, and further including:
    tubular housing structure enclosing the turbine, compressors and first combustion apparatus and connected to the casing structure, and the bleeding means is effective to bleed air from the second compressor.

3. A unitary open-cycle gas turbine power plant, comprising:
   a first multi-stage compressor having a rotor and a second multi-stage compressor having a rotor,
   a first gas turbine drivingly connected to said first compressor rotor,
   a second gas turbine drivingly connected to said second compressor rotor and having an output shaft for driving an external load,
   said turbines and compressors being coaxially arranged,
   first fuel combustion apparatus interposed between said first compressor and said first turbine for providing hot motive gases to said first turbine,
   casing structure encompassing the outlet of said first turbine and the inlet of said second turbine and defining a plenum chamber,
   second fuel combustion apparatus interposed in said plenum chamber for reheating the exhaust gases from said first turbine before admission to said second turbine,
   said second fuel combustion apparatus including at least one tubular combustion chamber,
   said combustion chamber having a primary combustion zone and a secondary combustion zone,
   means for admitting fuel to said primary combustion zone,
   annular partition structure disposed in said casing structure and dividing said plenum chamber into a first passageway connecting the outlet of said first turbine with said secondary zone, and a second passageway communicating with said primary zone, and
   means for bleeding pressurized air from one of said compressors and directing the bled air to said second passageway to support combustion in said primary zone.

4. The structure recited in claim 3, wherein
   the combustion chamber is of the elongated cannister type and has an upstream portion and an intermediate portion, and
   the primary zone is in the upstream portion and the secondary zone is in the intermediate portion of the combustion chamber.

5. The structure recited in claim 3, wherein
   the second fuel combustion apparatus includes an annular array of said tubular combustion chambers, and
   said combustion chambers are of the elongated cannister type.

6. The structure recited in claim 5, wherein
   the cannister combustion chambers have an upstream portion and an intermediate portion, and
   the primary zone is in the upstream portion and the secondary zone is in the intermediate portion of the combustion chambers.

References Cited by the Examiner

UNITED STATES PATENTS

| | | | |
|---|---|---|---|
| 2,504,181 | 4/1950 | Constant | 60—39.17 X |
| 2,511,385 | 6/1950 | Udale | 60—39.17 X |
| 2,613,500 | 10/1952 | Lysholm | 60—39.27 |
| 2,703,477 | 3/1955 | Anxionnaz | 60—35.6 |
| 2,704,434 | 3/1955 | Schmitt | 60—35.6 |
| 2,987,873 | 6/1961 | Fox. | |

JULIUS E. WEST, *Primary Examiner.*